United States Patent
Pfrenger et al.

(10) Patent No.: US 8,763,937 B2
(45) Date of Patent: Jul. 1, 2014

(54) METHODS AND SYSTEMS FOR ALIGNING IRRIGATION SYSTEMS

(75) Inventors: Jochen Pfrenger, Omaha, NE (US); Mark Miller, Elkhorn, NE (US); Reece Andrews, Arlington, NE (US)

(73) Assignee: Lindsay Corporation

( * ) Notice: Subject to any disclaimer, the term of this patent is extended or adjusted under 35 U.S.C. 154(b) by 255 days.

(21) Appl. No.: 13/220,365

(22) Filed: Aug. 29, 2011

(65) Prior Publication Data

US 2013/0048747 A1    Feb. 28, 2013

(51) Int. Cl.
*B05B 3/00*    (2006.01)

(52) U.S. Cl.
USPC .......................................... 239/732; 239/731

(58) Field of Classification Search
CPC .... A01G 25/092; A01G 25/097; A01G 25/09
USPC .......... 239/733, 732, 722, 730, 731, 726, 728
See application file for complete search history.

(56) References Cited

U.S. PATENT DOCUMENTS

| | | | | |
|---|---|---|---|---|
| 3,974,845 | A * | 8/1976 | Indresaeter | 239/731 |
| 4,034,778 | A * | 7/1977 | Sage et al. | 239/731 |
| 4,099,669 | A * | 7/1978 | Cortopassi | 239/1 |
| 4,191,207 | A * | 3/1980 | Jacobi et al. | 239/731 |
| 4,434,936 | A * | 3/1984 | Chapman et al. | 239/731 |
| 5,255,857 | A * | 10/1993 | Hunt | 239/731 |
| 5,613,641 | A | 3/1997 | Grothen | |
| 6,254,018 | B1 | 7/2001 | Ostrom | |
| 6,512,992 | B1 | 1/2003 | Fowler et al. | |
| 7,953,550 | B1 | 5/2011 | Weiting | |
| 2007/0267524 | A1 | 11/2007 | Mack | |

* cited by examiner

*Primary Examiner* — Davis Hwu
(74) *Attorney, Agent, or Firm* — Hovey Williams LLP

(57) ABSTRACT

An irrigation system includes a central pivot and a series of mobile towers connected to the central pivot and to one another by support structure. Each mobile tower has wheels and a motor for driving at least one of the wheels. A control system for maintaining alignment of the mobile towers includes a location-determining component for determining a position or orientation of each of the mobile towers and a computing device operable to detect mis-alignment of the mobile towers based on the position or orientation of each of the mobile towers, determine a control sequence to re-align the mobile towers, and send commands to at least one of the motors for implementing the control sequence.

17 Claims, 4 Drawing Sheets

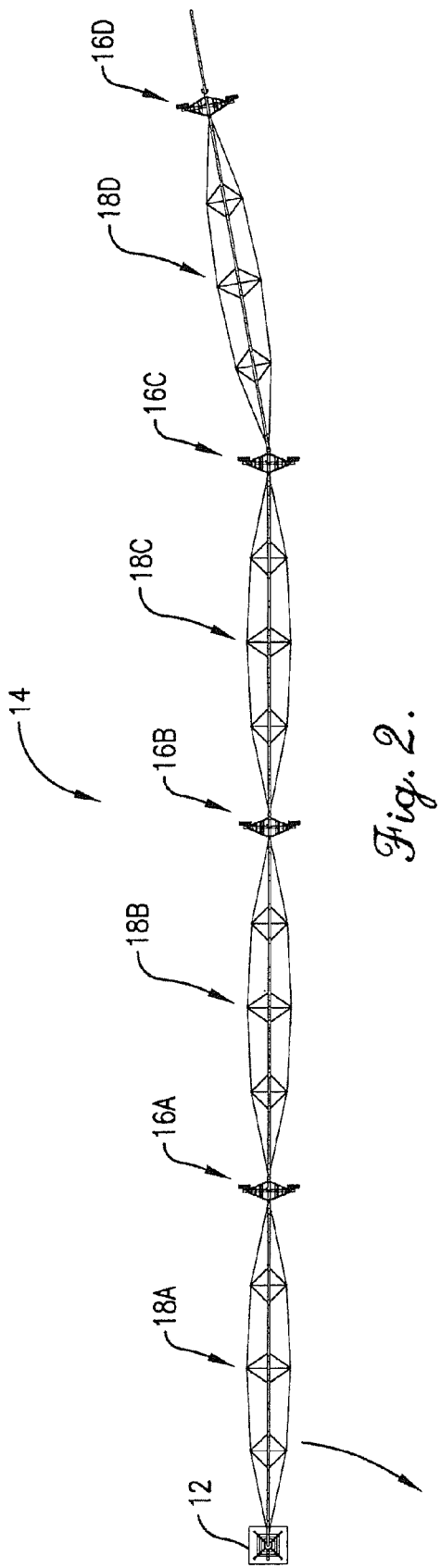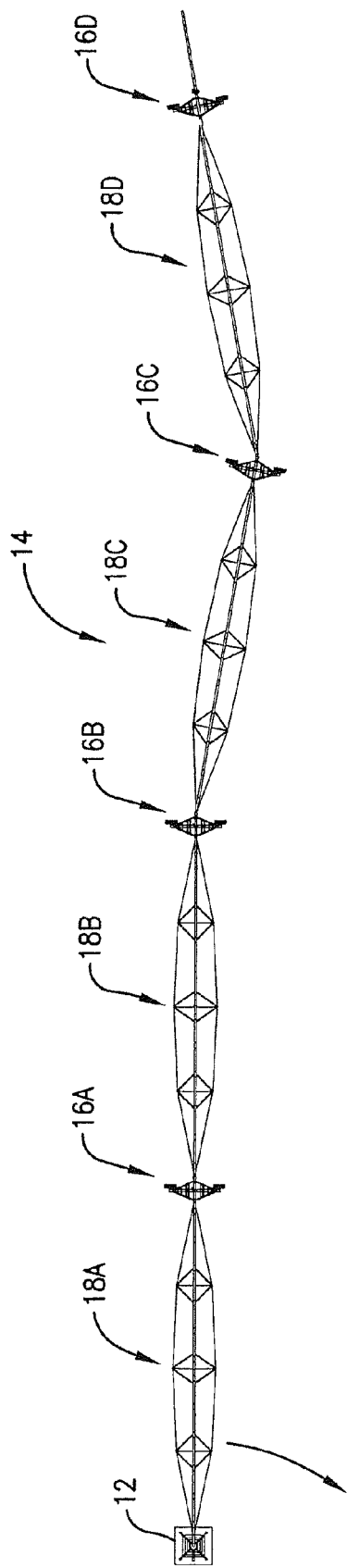

METHODS AND SYSTEMS FOR ALIGNING IRRIGATION SYSTEMS

BACKGROUND OF THE INVENTION

1. Field of the Invention

The present invention relates to agricultural irrigation systems. More particularly, the invention relates to methods and systems for aligning irrigation systems.

2. Background

Agricultural irrigation systems such as central pivot irrigation machines are commonly used to irrigate crops. A central pivot irrigation machine typically includes, among other things, a central pivot communicating with a pressurized water supply and a series of spans formed from mobile support towers connected to the central pivot and to one another by truss-type framework sections. The mobile support towers are supported on wheels that are driven by a motor on each tower. A water distribution conduit is supported by the framework sections and a number of sprinkler heads, spray guns, drop nozzles, or other fluid-emitting devices are spaced along the length of the conduit.

The mobile support towers and central pivot must stay aligned to prevent damage to the joints between the spans. Most known irrigation systems have mechanical mechanisms for maintaining the alignment of the spans. For example, one such mechanism includes a mechanical linkage at each span joint that operates a micro switch on its respective drive motor to turn the drive motor on and off and thus keep the span in alignment with the next span.

SUMMARY

A problem with mechanical alignment mechanisms is that they shut down the entire irrigation system if they fail to maintain alignment of the spans within some acceptable range. An operator must then travel to the irrigation system, inspect the mobile towers to determine the cause of the mis-alignment, and then selectively operate the drive motors on the mobile towers to re-establish alignment. Those skilled in the art will appreciate this is time-consuming and results in a significant loss of irrigation time. Moreover, the irrigation system may continue to operate its sprinklers even when shut down until a stall timer shuts off the water supply. This leads to over-watering of some areas and may contribute to rut-building as the irrigation system is operated backwards and forwards over wet ground while it is being re-aligned.

The present invention solves the above described problems by providing improved methods and systems for aligning irrigation systems. One embodiment of the invention is an irrigation system broadly comprising a central pivot; a series of motor-driven mobile towers connected to the central pivot and to one another by support structure; and a control system for maintaining alignment of the mobile towers.

An embodiment of the control system may comprise a location-determining component and a computing device. The location-determining component determines a position or orientation of each of the mobile towers. The computing device is operable to detect mis-alignment of the mobile towers based on the position or orientation of each of the mobile towers, determine a control sequence to re-align the mobile towers, and send commands to at least one of the motors for implementing the control sequence.

The control sequence may include turning some of the motors on or off, changing the direction of some of the motors, or increasing or decreasing the speed of some of the motors. The control system may also determine if the detected mis-alignment is within or outside safe operating parameters and to shut down the irrigation system if its alignment is outside safe operating parameters.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures. For example, the principles of the present invention are not limited to central pivot irrigation systems, but may be implemented in other types of irrigation systems including linear move irrigation systems.

BRIEF DESCRIPTION OF THE DRAWING FIGURES

Embodiments of the present invention are described in detail below with reference to the attached drawing figures, wherein:

FIG. 2 is a plan view of the irrigation system shown with its end tower out of alignment.

FIG. 3 is a plan view of the irrigation system shown with its end tower and adjacent tower out of alignment.

Figure 1:
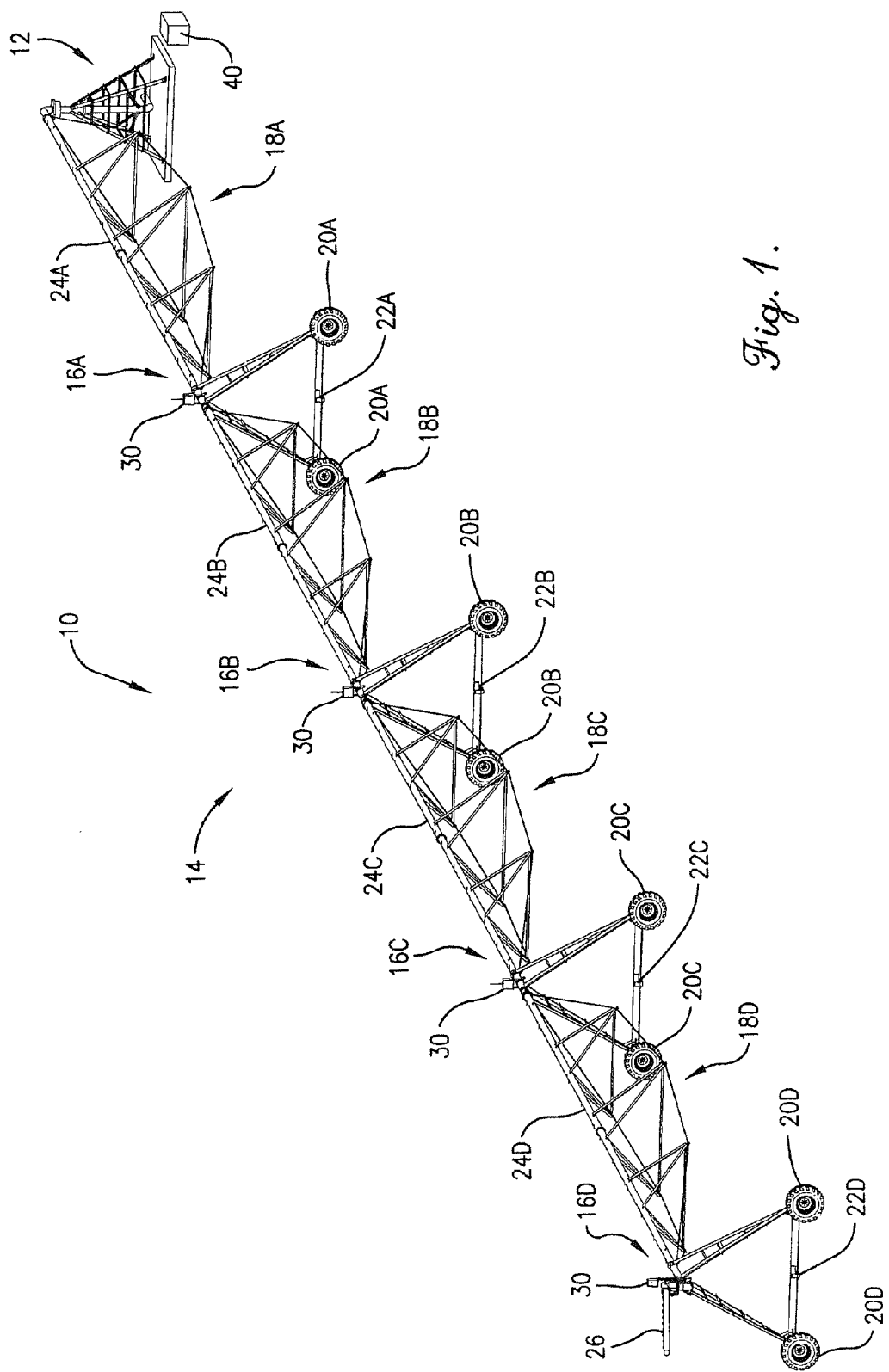
FIG. 1 is a perspective view of a central pivot irrigation system constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and initially FIG. 1, an exemplary irrigation system 10 on which principles of the present invention may be implemented is illustrated. An embodiment of the irrigation system 10 is a central pivot irrigation system and broadly comprises a fixed central pivot 12 and a main section 14 pivotally connected to the central pivot. The irrigation system 10 may also comprise an extension arm (also commonly referred to as a "swing arm" or "corner arm") pivotally connected to the free end of the main section.

The fixed central pivot 12 may be a tower or any other support structure about which the main section 14 may pivot. The central pivot has access to a well, water tank, or other source of water and may also be coupled with a tank or other source of agricultural products to inject fertilizers, pesticides and/or other chemicals into the water for application during irrigation.

The main section 14 may comprise any number of mobile support towers 16A-D, the outermost 16D of which is referred to herein as an "end tower". The support towers are connected to the fixed central pivot 12 and to one another by truss sections 18A-D or other supports to form a number of interconnected spans.

The mobile towers have wheels 20A-D, at least one of which is driven by suitable drive motors 22A-D. Each motor 22A-D turns at least one of its wheels 22A-D through a drive shaft to move its mobile tower and thus the main section in a circle about the central pivot to irrigate a field. The motors 22A-D may include integral or external relays so they may be turned on, off, and reversed as described below. The motors may also have several speeds or be equipped with variable speed drives.

Although not required, some or all of the towers 16A-D may be equipped with steerable wheels pivoted about upright axes by suitable steering motors so that the towers can follow a predetermined track. U.S. Pat. No. 4,508,269 in the name of Davis et al. is hereby incorporated by reference in its entirety into the present specification for a disclosure of ground drive motors and steering motors associated with an irrigation machine. As is also well known, the drive motors for the towers are controlled by a suitable safety system such that they may be slowed or completely shut down in the event of the detection of an adverse circumstance, all of which is disclosed, for example, in U.S. Pat. No. 6,042,031 to Christensen, et al. incorporated herein by reference in its entirety.

Each of the truss sections 18A-D carries or otherwise supports a conduit section 24A-D or other fluid distribution mechanism that is connected in fluid communication with all other conduit sections. A plurality of sprinkler heads, spray guns, drop nozzles, or other fluid-emitting devices are spaced along the conduit sections 24A-D to apply water and/or other fluids to land underneath the irrigation system.

The irrigation system 10 may also include an optional extension arm (not shown) pivotally connected to the end tower and may be supported by a swing tower with steerable wheels driven by a motor. The extension arm may be joined to the end tower by an articulating pivot joint. The extension arm is folded in relative to the end tower when it is not irrigating a corner of a field and may be pivoted outwardly away from the end tower while irrigating the corners of a field.

The irrigation system 10 may also include one or more high pressure sprayers or end guns 26 mounted to the end tower 16D or to the end of the extension arm. The end guns are activated at the corners of a field or other designated areas to increase the amount of land that can be irrigated.

The irrigation system 10 illustrated in FIG. 1 has four mobile support towers; however, it may comprise any number of mobile support towers, truss sections, wheels, and drive motors without departing from the scope of the present invention.

The irrigation system 10 may also include a main control system for controlling movement of the mobile towers 16A-D and operation of the fluid-emitting devices in accordance with an irrigation design program. The main control system may include a processor or other computing device with inputs that receive positional information from one or more GPS receivers mounted to the end tower or elsewhere. The processor may alternatively receive position information from angle encoders mounted between the central pivot and a first span of the main section. The processor may also include outputs connected to relay-controlled valves connected to the water-emitting devices and relay-controlled electric motors connected to the drive wheels of the mobile towers.

In accordance with aspects of the present invention, the irrigation system 10 also includes a control system 28 for maintaining alignment of the mobile towers 16A-D. The control system 28 can be implemented with hardware, software, firmware, or a combination thereof.

Figure 4:
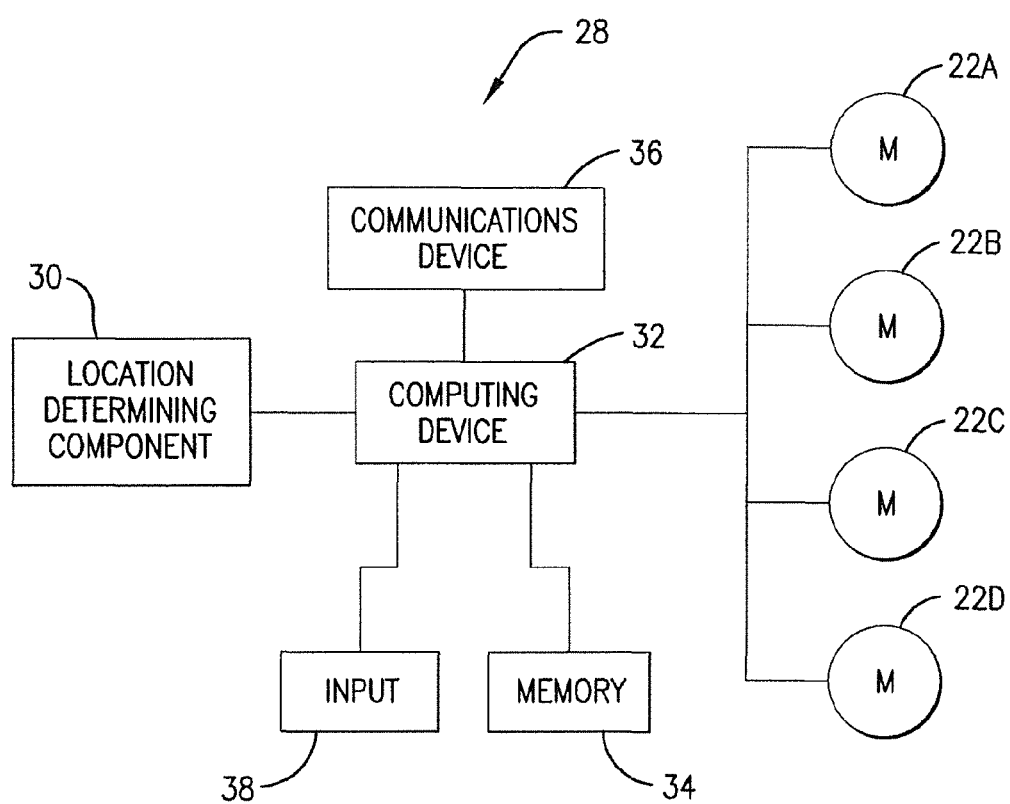
FIG. 4 is a schematic diagram of a control system constructed in accordance with an embodiment of the invention and shown coupled with a plurality of drive motors of an irrigation system such as the one shown in FIG. 1.

An embodiment of the control system 28 is illustrated in FIG. 4 and comprises a location-determining component 30, a computing device 32, memory 34, a communications device 36, and one or more inputs 38. The illustrated control system 28 is shown controlling four drive motors 22A-D for a four span irrigation system such as the one shown in FIGS. 1-3, but as mentioned above, the irrigation system 10 may have any number of spans and motors.

Some or all of the functionality of the control system 28 may be performed by the main control system or vice versa. In other words, the irrigation system 10 may include a separate main control system and control system 28 or a single control system that integrates some or all of the functions of the main control system and control system 28.

The location-determining component 30 may be any device capable of determining each mobile tower's position or orientation. The location-determining component 30 may comprise, for example, an angle encoder positioned at the joint of each span of the irrigation system for sensing an angle between each span and the adjacent span or spans. In some embodiments, the angle encoders may be incorporated in existing articulating joints positioned between the spans so the control system doesn't require its own dedicated angle encoders.

The location-determining component 30 may also be a global navigation satellite system (GNSS) receiver such as a GPS receiver, Glonass receiver, Galileo receiver, or compass system receiver attached to or near each mobile tower as illustrated in FIG. 1 and operable to receive navigational signals from satellites to calculate a position of each of the mobile towers as a function of the signals. Each GNSS receiver 34 may include one or more processors, controllers, or other computing devices and memory for storing information accessed and/or generated by the processors or other computing devices. In some embodiments, a single GNSS receiver receives satellite signals from separate antennas mounted to each mobile tower so that a receiver is not required at each tower. The GNSS receiver or receivers may be incorporated in the main control system so that the control system does not require its own dedicated GNSS receivers or may be stand-alone devices. Each GNSS receiver may be coupled with a patch antenna, helical antenna, or any other type of antenna.

The location-determining component 30 may also comprise one or more modified cam switches, proximity switches, optical encoders, potentiometers, light bar sensors, etc. at each span joint. The location-determining component 30 may also comprise other types of receiving devices capable of receiving location information from at least three transmitting locations and performing basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit.

The computing device 32 receives inputs from the location-determining component 30 and other components of the control system 28 and controls operation of the drive motors 22A-D to move and align the mobile towers 16A-D as explained in more detail below. The computing device 32 may comprise or include any number or combination of processors, controllers, ASICs, computers or other control circuitry. As mentioned above, the computing device 32 and other components of the control system 28 may be part of the main control system so that a separate dedicated control system 28 is not required.

A computer program that may be implemented by the computing device 32 may perform some of the control functions described herein. The computer program preferably comprises an ordered listing of executable instructions for implementing logical functions in the computing device. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). In one embodiment, the computer-readable medium is the memory 34.

The memory 34 may be any electronic memory that can be accessed by the computing device 32 and operable for storing instructions or data. The memory 34 or other memory may store control programs for operating the motors 22A-D in particular sequences and related data as discussed in more detail below. The memory 34 may be integral with the computing device 32 or may be external memory accessible by the computing device. The memory may be a single component or may be a combination of components that provide the requisite functionality. The memory may include various types of volatile or non-volatile memory such as flash memory, optical discs, magnetic storage devices, SRAM, DRAM, or other memory devices capable of storing data and instructions. The memory may communicate directly with the computing device or may communicate over a bus or other mechanism that facilitates direct or indirect communication. The memory may optionally be structured with a file system to provide organized access to data existing thereon.

The communications device 36 permits data, instructions, etc. to be transmitted to and from the computing device 32. The communications device may be a radio transreceiver, infrared transreceiver, Bluetooth device or any other wireless or wired communication device or system.

The input device 38 allows operators to input instructions into the control system 28 or otherwise operate or interact with the irrigation system. Each input device 38 may comprise any number and type of knobs, buttons, switches, dials, etc. or may be a part of a user interface such as a touchscreen display. The control system 28 may also include a display.

Some or all of the components of the control system 28 may be enclosed in or supported on a weatherproof housing 40 for protection from moisture, vibration, and impact. The housing 40 may be positioned anywhere such as on or near the central pivot 12 as illustrated in FIG. 1 and may be constructed from a suitable vibration- and impact-resistant material such as, for example, plastic, nylon, aluminum, or any combination thereof and may include one or more appropriate gaskets or seals to make it substantially waterproof or resistant.

The above-described components of the control system 28 need not be physically connected to one another since wireless communication among the various depicted components is permissible and intended to fall within the scope of the present invention.

In operation, the control system 28 monitors the position and/or orientation of the mobile towers 16A-D and selectively operates the motors 22A-D of the towers 16A-D to maintain alignment of the irrigation system 10. The control system 28 may implement various different methods for achieving these objectives, several embodiments of which are described below.

Figure 5:
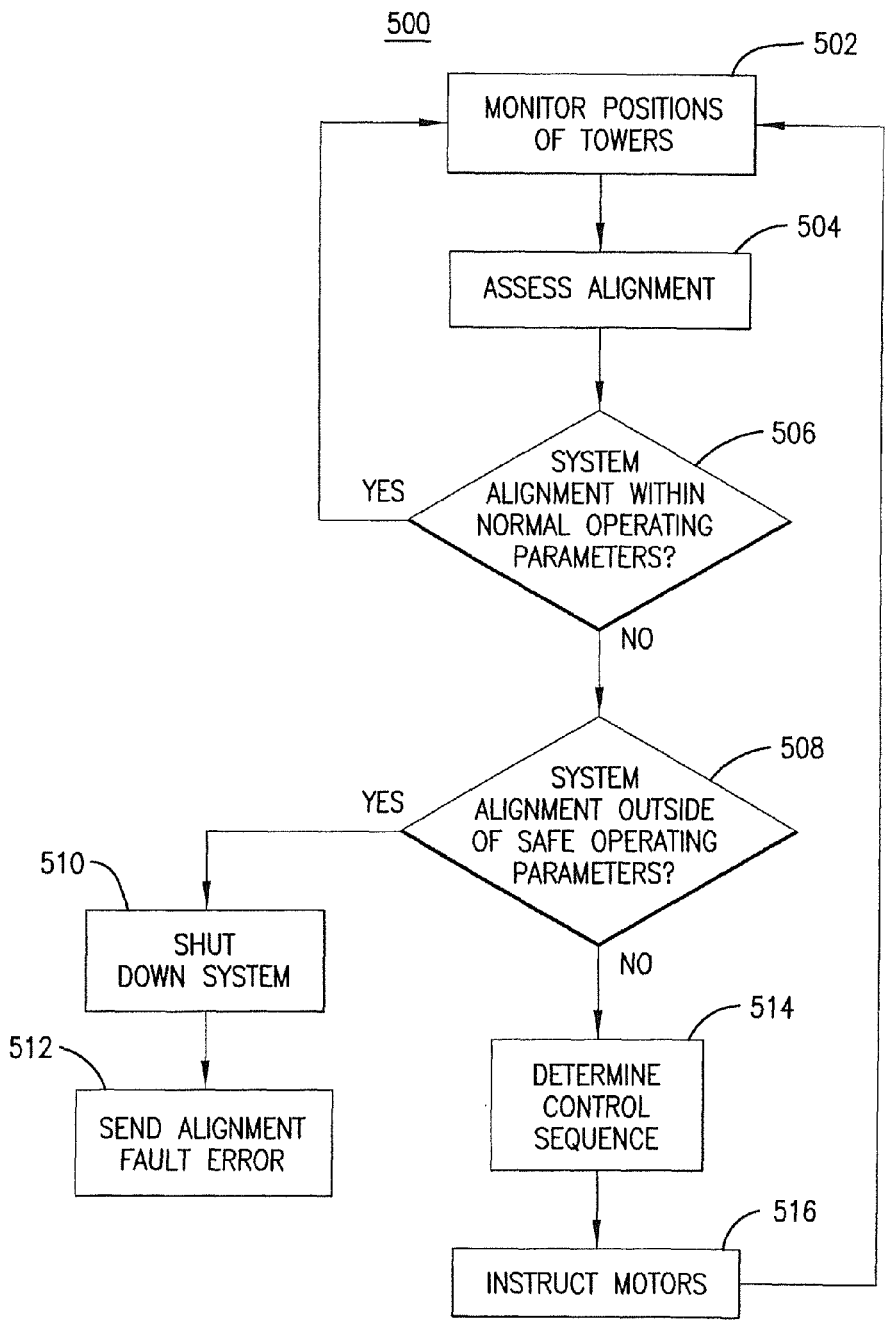
FIG. 5 is a flow diagram depicting the steps in a method or portions of a computer program of an embodiment of the present invention.

The flow chart of FIG. 5 shows the functionality and operation of an exemplary method 500 of the present technology. Some of the blocks of the flow chart may represent a step in the method 500 and/or a module segment or portion of code of computer programs the operate the control system 28. In some alternative implementations, the functions noted in the various blocks may occur out of the order depicted in FIG. 5. For example, two blocks shown in succession in FIG. 5 may in fact be executed substantially concurrently, or the block may sometimes be executed in the reverse order depending upon the functionality involved.

The method 500 begins in step 502 where the computing device 32 receives position or orientation information for each of the mobile towers 16A-D. The position or orientation information may be obtained from the location-determining component 30 or a similar device. In some embodiments, the information includes the latitude and longitude coordinates of each mobile tower 16A-D. In other embodiments, the information includes the angular orientation of each mobile tower measured from a reference line such as a line pointing North.

In step 504, the computing device 32 analyzes the position or orientation information for all the mobile towers 16A-D to determine if the mobile towers are in alignment. For example, the computing device may determine the position of each mobile tower and determine if the mobile towers are in a straight line extending out from the central pivot 12.

Step 506 then determines if the mobile towers 16A-D are aligned within normal operating parameters. In one embodiment, step 506 determines if each mobile tower is within a specified distance of its desired position along a straight line extending from the central pivot 12. Because the towers further from the central pivot 12 may be further from their desired positions than the closer towers without affecting the alignment as much, the allowed position deviation for each tower may be different. For example, the first tower 16A may be aligned within normal operating parameters if it is within two feet of its desired position, the second tower 16B may be aligned if it is within four feet of its desired position, the third tower 16C may be aligned if it is within six feet of its desired position, and the end tower 16D may be aligned if it is within eight feet of its desired position. If all the towers are positioned within these or other specified normal operating parameters, the method returns to step 502 to continue monitoring the position of the mobile towers.

If step 506 determines that any of the towers are not within normal operating parameters (i.e., the irrigation system is misaligned), step 508 then determines if the misalignment is outside of safe operating parameters. For example, in one embodiment, step 508 determines if the mobile towers 16A-D are within three feet, six feet, nine feet, and twelve feet, respectively, of their desired positions along a straight line extending out from the central pivot.

If step 508 determines any of the towers are outside safe operating parameters, step 510 shuts down all the drive motors 22A-D and sprinkler valves and step 512 sends an alignment fault error message to an operator via the communications device 36. An operator may then go to the irrigation system 10, inspect it, and attempt to re-align the spans.

However, if step 508 determines that none of the towers 16A-D are outside of safe operating parameters, the method proceeds to step 514 where the computing device 32 determines a control sequence to automatically re-align the mobile towers. The computing device may consider several factors when calculating the control sequence such as the degree of mis-alignment of each tower, the distance each tower is from the central pivot, the type of motors (fixed speed, multiple speed, variable speed), and the overall desired speed of the irrigation system.

The control sequence may include turning some of the motors on or off, changing the direction of some of the motors, and/or increasing the speed of some of the motors in order to re-align the mobile towers. For example, if the spans of the irrigation system are as shown in FIG. 2, with the end tower 16D out of alignment and lagging the other towers, the computing device may create any of the following control sequences:

1) increase the speed of the motor 22D while maintaining the current speed of the other motors 22A-C until the end tower 16D is in alignment with the other towers;
2) turn the motor 22D on and turn the other motors 22A-C off until the end tower 16D is in alignment with the other towers; or
3) stop the motor 22D while reversing the direction of the motors 22A-C until the end tower is in alignment.

In another example, the spans of the irrigation system may be as shown in FIG. 3, with the end tower 16D lagging the other towers, and the second to last tower 16C leading the other towers. In this example, the computing device may create any of the following control sequences:

1) increase the speed of the motor 22D and decrease the speed of the motor 22C while maintaining the current speed of the other motors 22A-B until the towers 16C and 16D are in alignment with the other towers;
2) turn the motors 22A, B, and D on and turn the motor 22C off until the end tower 16D and tower 16C are in alignment with the other towers; and
3) stop the motors 22A, B, and D while reversing the direction of the motor 22C until the towers 16C and 16D are in alignment with the other towers.

In some embodiments, the computing device 32 selects a control sequence that will maximize the overall speed of the irrigation system 10 so as to minimize the time it takes the irrigation system to irrigate a field or other area. For example, in the two examples above, the computing device 32 may select the control sequences that increase the motor speed of the lagging tower rather than the control sequences that stop or reverse the motors of the leading towers. These are just examples of possible control sequences for the control system 28. Other control sequences may be created without departing from the scope of the invention.

In step 516, the computing device 32 operates at least some of the motors 22A-D in accordance with the selected control sequence so as to re-align the mobile towers. The computing device may operate the motors one at a time or may operate several of the motors concurrently. The method then returns to step 502 to repeat the above-described steps. The above described steps may be performed nearly continuously or only periodically (e.g. every 5 seconds) so as to avoid frequent cycling of the motors.

In other embodiments, the control system 28 may comprise a plurality of controllers, one coupled to each of the motors, rather than just one computing device 32. Each controller may comprise any number or combination of processors, controllers, ASICS, computers, or other central circuitry and is provided for receiving instructions from the computing device 32 and controlling activation of its motor 22A-D in response thereto. The controllers may also include variable speed drive circuitry when the motors 22A-D are variable speed motors. The purpose of the controllers is to distribute some of the processing requirements of the computing device 32. For example, the computing device 32 may determine the degree of misalignment of each mobile tower and then send instructions to each controller on the amount of correction needed. Each controller may then determine how long to operate its motor, and at which speed, to re-align its mobile tower. Once a controller re-aligns its mobile tower, it may turn off its motor and send a confirmation to the computing device 32. This allows the central computing device 32 to determine which of the mobile towers are the most mis-aligned and to selectively and individually instruct the controllers to re-align the mobile towers in the order or sequence of most importance.

In still other embodiments of the invention, the above-described control steps may be performed by an external computing device not located on the irrigation system 10. The external computing device may communicate with the drive motors 22A-D and/or the controllers connected to the drive motors via wireless communication channels.

Although the invention has been described with reference to the embodiments illustrated in the attached drawing figures, it is noted that equivalents may be employed and substitutions made herein without departing from the scope of the invention as recited in the claims. For example, the principles of the present invention are not limited to the illustrated central pivot irrigation systems but may be implemented in any type of irrigation system including linear move irrigation systems.

Having thus described the preferred embodiment of the invention, what is claimed as new and desired to be protected by Letters Patent includes the following:

1. An irrigation system comprising:
   a central pivot;
   a series of mobile towers connected to the central pivot and to one another by support structure, each mobile tower having wheels and a motor for driving at least one of the wheels; and
   a control system for maintaining alignment of the mobile towers, the control system comprising— a location-determining component for determining a position or orientation of each of the mobile towers; and a computing device operable to detect mis-alignment of the mobile towers based on the position or orientation of each of the mobile towers, determine a hierarchy of decreasing mis-alignment of all of the mobile towers and a degree of mis-alignment based on the position or orientation of each of the mobile towers, determine a control sequence to re-align the mobile towers based on the hierarchy send commands to at least one of the motors for implementing the control sequence, and instruct the motors to realign the mobile towers, an order of activation of each motor being a function of a rank of the respective mobile tower in the hierarchy and a speed and a duration of operation of each motor being a function of the degree of mis-alignment of the respective mobile tower, the commands including a signal representative of the speed and the duration of the respective motor, wherein the computing device is operable to shut down the irrigation system and send a notification to an operator if the mis-alignment of the mobile towers is outside safe operating parameters.

2. The irrigation system as set forth in claim 1, wherein the control sequence includes turning some of the motors on or off, changing the direction of some of the motors, or increasing or decreasing the speed of some of the motors.

3. The irrigation system as set forth in claim 1, wherein the computing device is further operable to determine if the mis-alignment of the mobile towers is within safe operating parameters or outside safe operating parameters.

4. The irrigation system as set forth in claim 1, wherein the computing device is operable to select a control sequence to re-align the mobile towers that maximizes an overall speed of the mobile towers so as to minimize an amount of time used to irrigate an area.

5. The irrigation system as set forth in claim 1, further comprising:
an input device communicatively coupled to the control system and operable to allow an operator to provide an input into the control system.

6. The irrigation system as set forth in claim 1, wherein the location-determining component comprises an angular encoder positioned at a span joint adjacent each of the mobile towers.

7. The irrigation system as set forth in claim 1, further comprising:
a water distribution conduit supported by the support structure; and
a number of fluid-emitting devices connected to the water distribution conduit.

8. The irrigation system as set forth in claim 7, further comprising a main control system for controlling movement of the mobile towers and operation of the fluid-emitting devices in accordance with an irrigation control program, wherein the control system is part of the main control system.

9. The irrigation system as set forth in claim 1, wherein the computing device comprises a central computing device coupled with all the motors.

10. The irrigation system as set forth in claim 1, wherein the computing device comprises a plurality of distributed controllers, one coupled with each of the motors.

11. An irrigation system comprising:
a plurality of mobile towers, each mobile tower having wheels and a motor for driving at least one of the wheels;
a location-determining component for determining a position or orientation of each of the mobile towers; and
a computing device operable to detect mis-alignment of the mobile towers based on the position or orientation of each of the mobile towers, determine a degree of mis-alignment of each mobile tower based on the respective mobile tower's position or orientation, determine a control sequence to re-align the mobile towers, and send commands to at least one of the motors for implementing the control sequence,
wherein the computing device is operable to determine if the mis-alignment of the mobile towers is within safe operating parameters or outside safe operating parameters and shut down the irrigation system and send a notification to an operator if the mis-alignment of the mobile towers is outside safe operating parameters and instruct the motors to realign the mobile towers in an order or a sequence of decreasing mis-alignment according to the hierarchy if the mis-alignment of the mobile towers is within safe operating parameters, a speed and a duration of operation of each motor being a function of the degree of mis-alignment of the respective mobile tower, the commands including a signal representative of the speed and the duration of the respective motor.

12. The irrigation system as set forth in claim 11, wherein the control sequence includes turning some of the motors on or off, changing the direction of some of the motors, or increasing or decreasing the speed of some of the motors.

13. The irrigation system as set forth in claim 11, wherein the location-determining component comprises a global positioning component mounted to each of the mobile towers or an angular encoder positioned at a span joint adjacent each of the mobile towers.

14. The irrigation system as set forth in claim 11, wherein the computing device comprises a central computing device coupled with all the motors or a plurality of distributed controllers, one coupled with each of the motors.

15. A method of operating an irrigation system having a plurality of mobile towers each with wheels and a drive motor for driving one of the wheels, the method comprising:
(a) determining a current location or orientation of each of the mobile towers;
(b) determining if the mobile towers are mis-aligned;
(c) if the mobile towers are mis-aligned, determining if the mis-alignment is within safe operating parameters or outside the safe operating parameters;
(d) if the mis-alignment is outside the safe operating parameters, shutting down the irrigation system and sending an alert to an operator;
(e) if the mis-alignment is within the safe operating parameters, determining a hierarchy of decreasing mis-alignment of all of the mobile towers, a degree of mis-alignment based on the position or orientation of each of the mobile towers, and a control sequence to re-align the towers based on the hierarchy; and
(f) selectively operating the motors in response to step (e) to implement the control sequence, an order of activation of each motor being a function of a rank of the respective mobile tower in the hierarchy and a speed and a duration of operation of each motor being a function of the degree of mis-alignment of the respective mobile tower, the commands including a signal representative of the speed and the duration of the respective motor.

16. The method of claim 15, wherein step (e) includes the step of selecting a control sequence that maximizes an overall speed of the mobile towers so as to minimize an amount of time used to irrigate an area.

17. The irrigation system as set forth in claim 15 wherein step (f) includes turning some of the motors on or off, changing the direction of some of the motors, or increasing or decreasing the speed of some of the motors.

* * * * *